Dec. 27, 1960   J. A. ROBERTS ET AL   2,966,195
DIMPLING MACHINE

Filed Sept. 30, 1957   6 Sheets-Sheet 1

INVENTORS:
JAMES A. ROBERTS
HOWARD R. FISCHER
BY
ATTORNEY

Dec. 27, 1960    J. A. ROBERTS ET AL    2,966,195
DIMPLING MACHINE
Filed Sept. 30, 1957    6 Sheets-Sheet 5

INVENTORS:
JAMES A. ROBERTS
HOWARD R. FISCHER
BY
R. G. Muller
ATTORNEY

United States Patent Office 2,966,195
Patented Dec. 27, 1960

2,966,195

DIMPLING MACHINE

James A. Roberts and Howard R. Fischer, Utica, N.Y., assignors to Chicago Pneumatic Tool Company, New York, N.Y., a corporation of New Jersey Filed Sept. 30, 1957, Ser. No. 686,964

6 Claims. (Cl. 153—21)

This invention concerns a dimpling machine subject to electrically controlled pneumatic and hydraulic operating power to effect, as desired, either hot or cold dimpling in sheet metal material.

In various industries, particularly in the aircraft industry, it is the practice in the manufacture of sheet metal products to form dimples in the material in order to accommodate flush type fasteners. In the aircraft industry a wide range of sheet metal materials are used. They vary in composition, thickness, strength, hardness, and in other ways. Some of these materials may be cold dimpled with good results; while others such as the hard and brittle materials, must be hot dimpled to avoid cracking in the dimple. Some of the materials are tough and of heavy gage, so that a strong compressive force is needed to effect dimpling in these; while others which are softer and of lighter gage require a lesser compressive force to effect dimpling therein.

Accordingly, the general object of this invention is to provide a versatile dimpling machine which can, as desired, be caused to effect either a hot or cold dimpling operation, and which can be adjusted to provide the compressive forces required to effect dimpling in various materials as demanded by the particular characteristics thereof.

A feature of the invention lies in certain controls and structures whereby pneumatic and hydraulic power are employed to effect a cycle of operation of a ram to effect a dimpling operation.

Another feature of the invention is an arrangement of electrically controlled devices whereby the supply of pneumatic and hydraulic power to the ram is regulated to automatically effect a desirable fast and slow action pattern of movement of the ram relative to a work piece.

Another feature of the invention lies in certain mechanism for adjusting the degree of compressive force that is to be imparted to the work piece in accordance with the characteristics of the latter.

A further feature of the invention lies in certain controls for effecting automatic stoppage of the ram in its descent in cases of an obstruction, or a defective disposition of the work material.

A still further feature of the invention lies in certain mechanisms whereby the length of the ram stroke may be adjusted.

Another feature of the invention lies in an electrical control circuit whereby the ram is caused to pass through a single cycle of operation and then stop until the operator takes certain further positive action.

Accordingly, a further object of the invention is to provide a novel and improved hot and cold dimpling machine for sheet materials, which is efficient in operation, practical in structure, and suitable for use in effecting dimpling operations in materials having various characteristics.

A still further object of the invention is to provide a practical dimpling machine having all of the foregoing features.

The invention further lies in the particular structure and novel arrangement of its various components, and also in their cooperative association with one another to effect the results intended herein.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

*General description*

Figures 1A, 2:
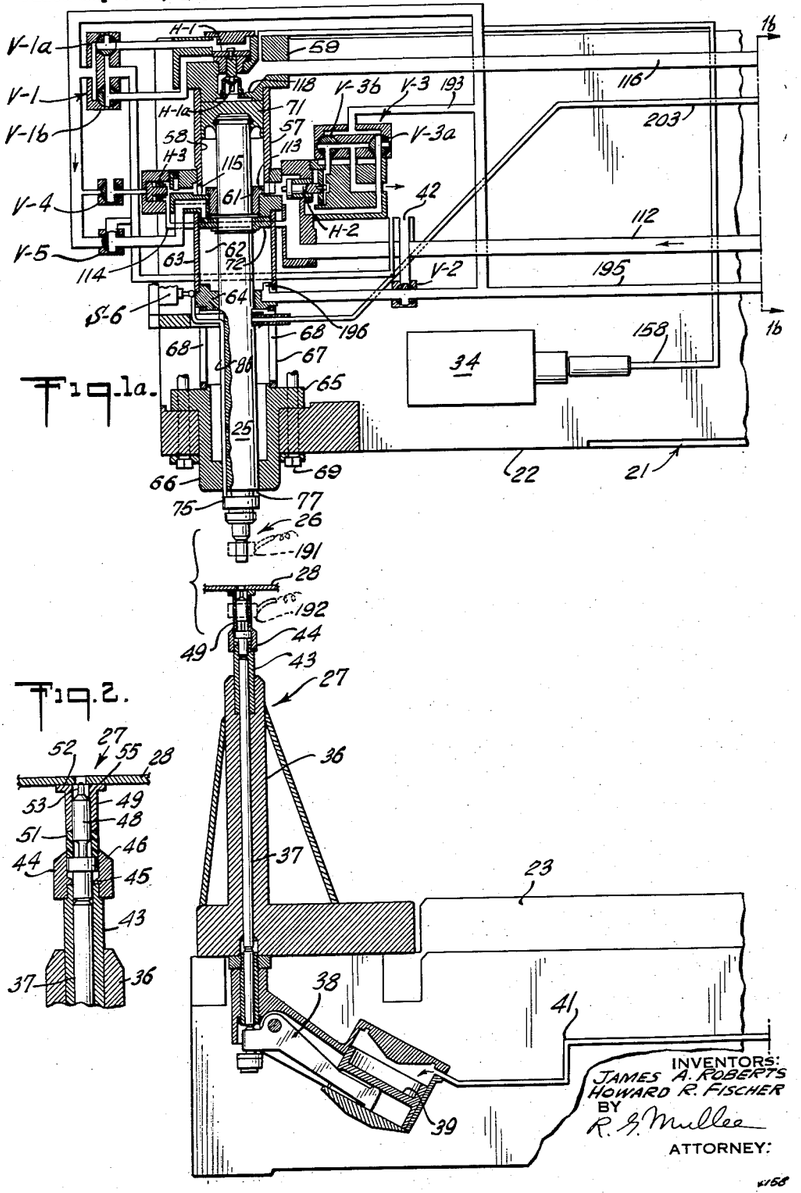
Figs. 1a and 1b comprise a schematic showing of the machine with the ram in idle position.
Fig. 2 is an enlarged detail of the punch pilot assembly.
Figure 1B:
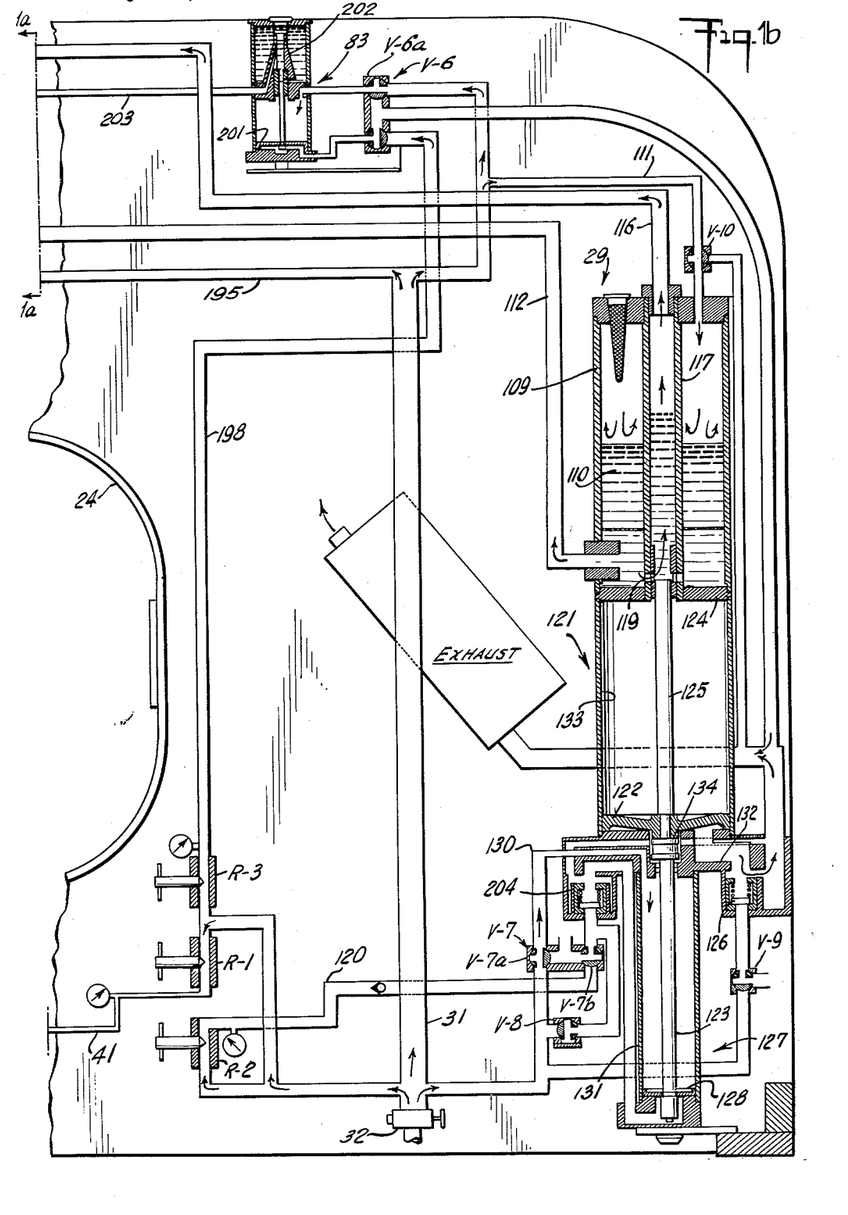
Figure 3:
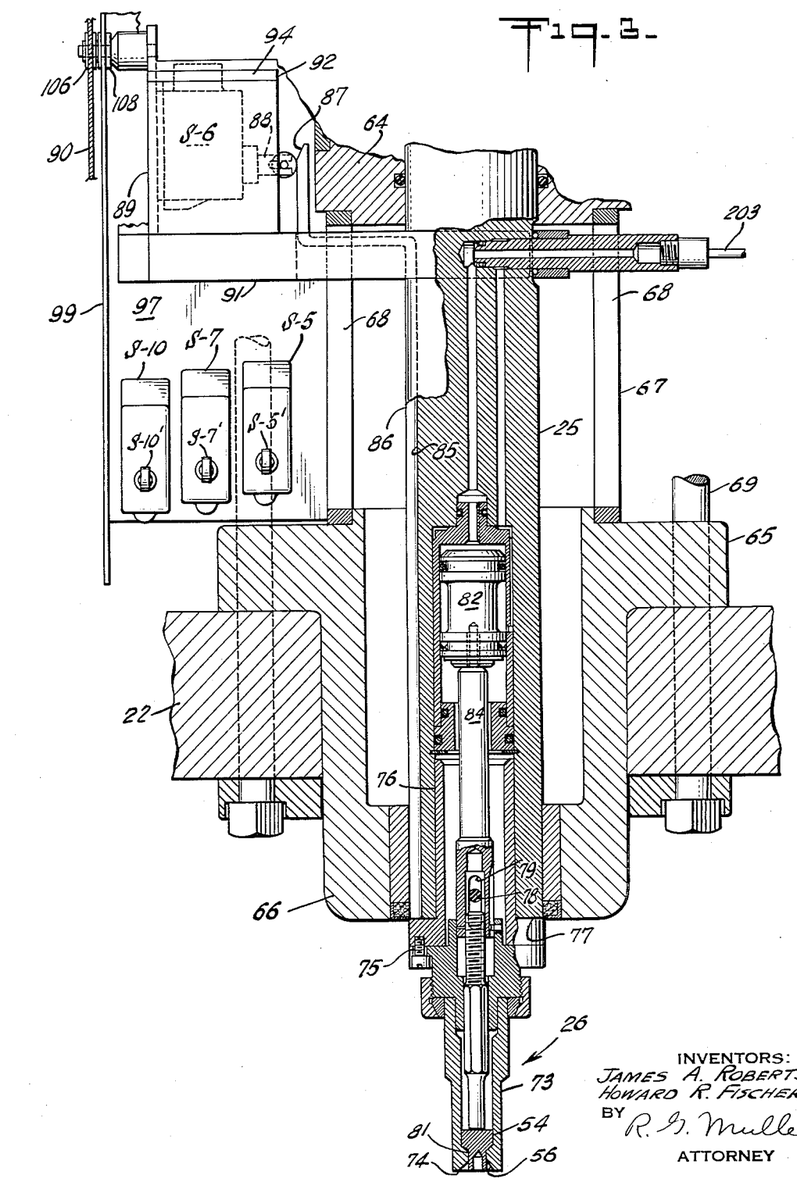
Fig. 3 is a fragmentary section on the line 3—3 of Fig. 6.

Reference is now directed to the several drawings wherein there is shown (Figs. 1a and 1b) a yoke frame 21 having spaced upper and lower arms 22, 23, bridged together by a back section 24. Arranged for reciprocal vertical movement in the upper arm is a ram set holder assembly including a ram 25 carrying a die or dimple set assembly 26. The latter is cooperable with an opposed punch pilot assembly 27 to effect a dimpling action in a piece of sheet work 28.

Figure 4:
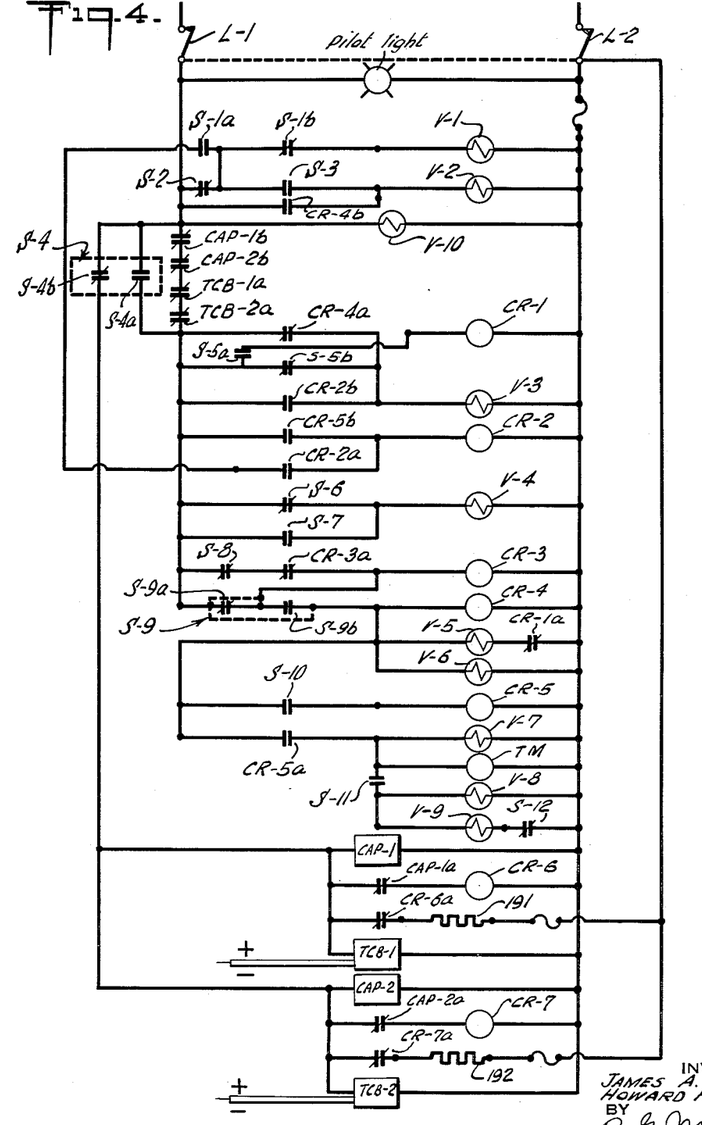
Fig. 4 is a diagram of the control circuit.

The ram is reciprocable through a cycle of operation by a controled application to it of pneumatic and hydraulic power. The hydraulic power is provided by pressurized oil fed to the ram from a pneumatically powered hydraulic system 29. The pneumatic power for the ram and the hydraulic system is supplied from a main line 31 connected through a supply valve 32 to a suitable source of pressure air, not shown, preferably having 90 lbs. pressure per sq. in. The flow of pneumatic and hydraulic fluid to effect reciprocation of the ram is controlled by a plurality of electrically operated devices in an electrical control circuit (Fig. 4).

After the pneumatic supply valve 32 is turned "on", the machine is conditioned for operation by manually closing power line switches L–1, L–2 to the control circuit. A selector switch S–4 is arranged in the circuit to prepare the machine for either a cold or hot dimpling operation, as may be selected. The reciprocation of the ram is initiated by depressing a foot switch S–9 in the circuit, whereupon the ram is caused to pass through a complete cycle of operation, effecting a dimpling operation in the work material as it does so. As a safety measure, the ram will not automatically pass through a repeat cycle unless the foot switch is first released and then again depressed.

A plurality of switches, later to be identified herein, which control the operation of various flow control devices are caused to automatically operate as the ram reciprocates through a dimpling operation. On the down stroke of the ram certain switches S–6 and S–7 function as a precaution to make certain that the work piece is properly positioned before a compressive dimpling force is applied to the work piece. Should the work piece be improperly positioned switch S-6 will be operated before switch S-7 so as to establish a circuit which will cause the ram to stop further movement; otherwise, switch S-7 will be operated before switch S-6.

Figure 7:
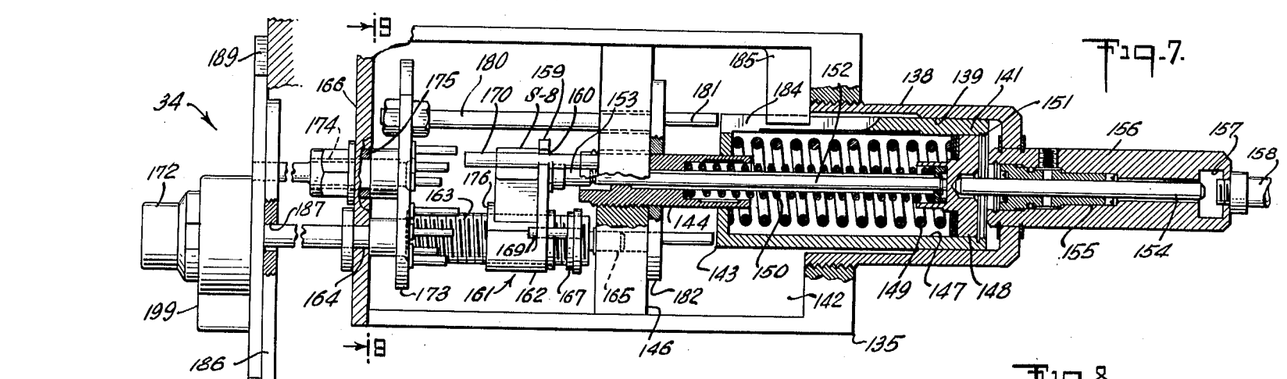
Fig. 7 is a longitudinal section through the pressure control device.
Figure 8:
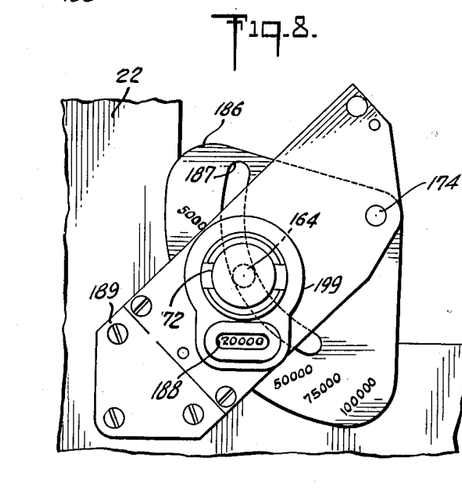
Fig. 8 is a front end view of Fig. 7.

In forming the dimple itself a strong hydraulic compressive force is exerted upon the ram. As this force builds up to a predetermined value, a switch S-8 in a pressure control device 34 (Fig. 7) is actuated to open various circuits whereby the dimpling process ceases and the ram is caused to rapidly return to its idle position. This pressure control device is adjustable so that a compressive hydraulic pressure selected from a power range of 2500 lbs. to 100,000 lbs. may be developed by the ram in the dimpling process before the pressure control switch S-8 will be actuated to terminate the dimpling process.

Other adjustable controls, later to be identified, are associated with certain of the switches, whereby their time of operation is affected. These controls permit an adjustment of the length of the ram's stroke in accordance with the time of operation of the associated switches.

Electric heater elements 191, 192 are respetcively carried by the die set assembly 26 and the punch pilot assembly 27 for transmitting heat to the work piece 28 in a hot dimpling operation.

*The punch pilot assembly (Figs. 1a, 1b, 2, 3)*

The punch pilot assembly 27 includes a vertical support or post 36 fixed to the lower yoke arm 23. Extending through this arm and through the post is a plunger rod 37 supported upon an arm of a pivoted bellcrank 38. Another arm of the latter is loaded down by a pneumatically pressurized piston 39. Pressure air is supplied to this piston by a line 41 communicating through a pressure regulator R-1 with the main air line 31. The upper end of the plunger projects into a sleeve 43 secured in the post. Secured over the end of the sleeve is an open ended retainer or collar 44 having an inner annular shoulder 45 upon which the head end of a button 46 is adapted to seat. A tail end of the button depends into the sleeve and rests atop the plunger 37. Resting upon the head of the button is a punch pilot element 48 which is sleeved about by a pressure pad member 49. Bonded to the lower end of the latter is an annular resilient pad 51 which rests within the retainer 44 upon the head of the button. The upper body portion of the pressure pad member is of strong rigid metal and provides a table or anvil surface 52 on which the work piece 28 is adapted to lie. The punch pilot element has a pilot pin 53 which is adapted in the dimpling process to pass through a preformed hole in the work material and to project slightly into a complementary recess of a compression block 54 (Fig. 3) carried in the die set assembly above. The punch pilot element is further characterized by a conical dimple forming surface 55 which cooperates with a complementary cavity 56 in the die set assembly to effect a dimple in the work piece. The punch pilot element is loaded upwards by the plunger 37 and button 46 to a position wherein the pilot pin 53 is flush with the table surface 52 of the pressure pad and the head of the button is slightly above its seat 45. The arrangement is such that when ram pressure is applied through the work piece to the table surface 52, the button is forced upon its seat to a stationary position cushioned by a proper pressure developed at the opposite end of the plunger. As the ram pressure increases, the table surface recedes as the resilient pad portion 51 yields slightly, whereupon the pilot pin rises to enter the preformed hole in the work piece and the conical surface of the punch pilot element rises to cooperate with the cavity 35 of the die set assembly above to form a dimple in the work piece about the hole.

*Ram set holder assembly (Figs. 1a, 3, 4)*

The ram set holder assembly is housed in a vacant area in the upper yoke arm 22. Arranged in the latter is an upper cylinder 57 forming an oil piston chamber 58 which is sealed at the top by a plug block 59. A fixed bushing 61 separates this chamber from an air piston chamber 62 provided by a cylinder 63 directly below. The latter is closed over at the bottom by a fixed bushing 64. Disposed between the latter bushing and a flange 65 of a crown cap 66 is a cylinder 67 having opposed vertical slots 68 in its side wall. The several cylinders are tied together by a plurality of circumferentially spaced tie rods 69. The ram member 25 has an elongated body carrying an oil driven piston head 71 which works in the oil piston chamber. Lower down it also carries an air driven piston 72 which works in the air piston chamber. The lower portion of the ram extends axially through cylinder 67 and through the crown cap 66 to the outside. The die set assembly 26 is carried by this external end portion of the ram.

The die set assembly 26 includes a die set piece 73 in the end of which the conical cavity 56 is formed. Surrounding this cavity is an end face 74 which is adapted to press upon the work piece about the preformed hole in the latter during a dimpling action. The die set member is joined at its upper end by radial flanged elements 75 with a sleeve member 76 that is slidable in a counterbore of the ram body. The upward movement of the sleeve is limited upon abutment of flange 75 with the end face 77 of the ram. A cross pin 78 fixed at its ends in the body of the ram passes through a pair of opposed short vertically extending slots 79 in the sleeve, whereby the die set piece 73 has a dropped position limited by the upper walls of the slots. In this dropped position the flange 75 is spaced a short distance from the end 77 of the ram, as appears in Fig. 1a.

The counterbore in the ram body further accommodates means (Fig. 3) for exerting a compressive force against the free edge of the dimple in the work piece as the dimple is being formed. This means includes the compression block 54 which is adapted to limit upon a conical seat formed in a recessed area of the die set piece 73. In the seated condition of block 54 a pilot set end 81 of the latter projects into the cavity 56. A piston 82 subject to hydraulic pressure provided by an air powered booster pump 83 (Fig. 1b) serves to load a ram rod 84 against the compression block. The ram rod is formed with a slot similar to slots 79 to accommodate the cross pin 78 so that it will not interfere with upward sliding movement of the die set piece 73 and the connected sleeve 76. Rod 84 is adjustable in length.

Upward movement of the die set piece 73 functions to effect the opening of a micro switch S-6. To this end, the ram has a longitudinal channel 85 in its surface which opens out at its bottom end above the flange 75. Slidable in this channel is a cam rod 86 which has a dropped position as in Fig. 1a, wherein its bottom end rests atop the flange 75. The upper end of the cam rod is offset away from the ram body sufficiently to project through a slot 68 to the outside of cylinder 67. The rod then extends upwardly and has a cam surface 87 at its upper end which is adapted to actuate switch S-6 through a roller arm 88. The latter action occurs when the die set piece 73 is moved upward and carries the cam rod up with it, as appears in Fig. 3.

Switch S-6 is fixed to a vertical beam or upright 89 carried outside of the lower cylinder 67 on the free end of the stem portion of a forked bracket 91. The fork of the bracket is fixed within cylinder 67 to the body of the ram, so that the bracket together with switch S-6 move as a unit with the ram.

The stem portion of bracket 91 is also formed with a pair of parallel horizontally disposed cam arms 92, 93. Arm 92 has a cam face 94 along its upper edge which functions to actuate micro switches S-1 and S-3 through associated roller arms. These switches are mounted to the inner face of a vertically disposed crank plate 95 located in a plane that is in parallel spaced relation to the cam arm 92. Switch S–1 is laterally spaced from switch S–3 and at a slightly higher level. Arm 93 has a cam face 96 along its under edge which functions to actuate micro-switches S–5, S–7 and S–10 through their associated roller arms S–5′, S–7′, S–10′. These switches are mounted to the inner face of a crank plate 97 similar to plate 95 and disposed in a plane that is in parallel spaced relation to cam arm 93. The switches are laterally spaced from each other; S–5 is slightly higher up than S–7 and the latter is slightly higher up than S–10.

Figure 5:
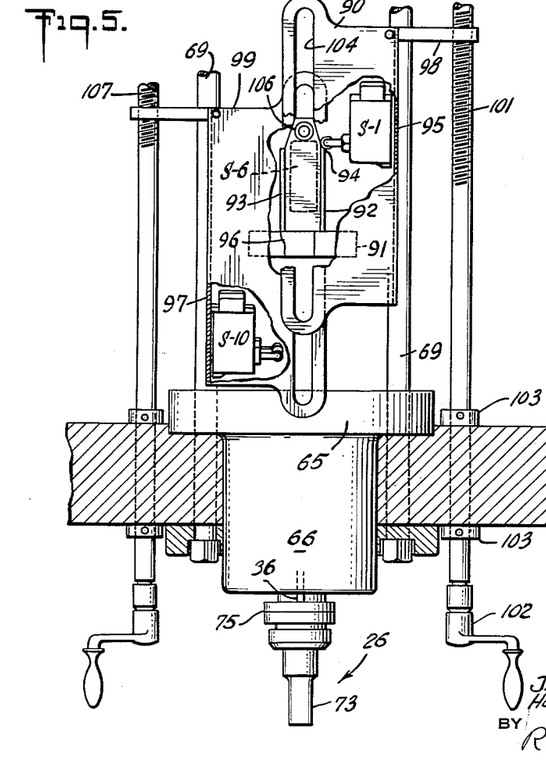
Fig. 5 is a detail of the controls for adjusting the length of the ram stroke.

When ram 25 is in its upper or idle position (Fig. 1a), the roller arm of switch S–1 is in a condition held actuated by cam arm 92 (Fig. 5) so that its contact S–1a is open and its contact S–1b is closed (Fig. 4). Switch S–3 serves a particular function in effecting an adjustment in the length of the stroke of the ram as will be later described. Its roller arm is normally unactuated or clear of the cam arm 92 so that its single contact is open. In the idle upper position of the ram, the roller arms of switches S–5, S–7 and S–10 are unactuated or clear of cam arm 93, so that contact S–5a (Fig. 4) is open and contact S–5b is closed, and so that the single contacts of switches S–7 and S–10 are open.

Figure 6:
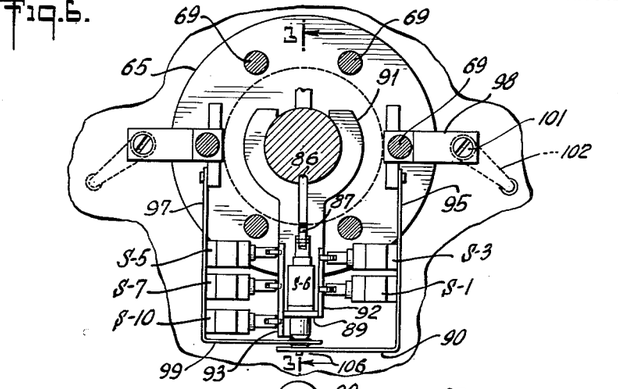
Fig. 6 is a top plan view of Fig. 5.

The switch supporting crank plates 95, 97 (Figs. 3, 5, 6) are adjustable in a vertical plane so that the time of operation of the different switches by their respective cam arms may be varied. To enable this, plate 95 is unitary with a flanged plate 90 which has a laterally extending ear 98 at its top. One of the tie rods 69 passes with a slide fit through this ear, and serves as a guide for vertical movement of the plate. This ear is threaded for vertical travel upon a crank screw 101, the lower portion of which passes freely through the bottom wall of the yoke arm 22 and carries at its external end a handle 102. Suitable means, such as collar elements 103 may be provided to fix the rotatable position of the screw in the yoke arm. Rotation of the crank screw 101 in a clockwise direction (Fig. 5) will carry crank plate 95 and switches S–1, S–3 upward relative to the cam arm 92; counterclockwise movement has the reverse effect. The crank plate is guided in this movement by the associated tie rod and also by an elongated slot 104 in the flange plate 90, which engages a roller 106 supported by the beam 89 of bracket 91. Crank plate 97 is similarly associated with a flange plate 99 arranged on a second crank screw 107, and is guided by a second one of the tie rods 69 and by a second roller 108 carried by beam 89.

Crank screw 107 is employed in obtaining an accurate adjustment of switch S–7 relative to the cam arm 93 so that it will be actuated a little earlier than switch S–6. If, however, because of an improper positioning of the work piece relative to the punch pilot assembly 27, the cam rod 86 is caused to be carried upwardly by the flange 75 of the die set piece to actuate switch S–6 before ram 25 has moved down a sufficient distance for cam arm 93 to actuate switch S–7, certain circuits will result which will stop further descent of the ram until the defective disposition of the work piece is relieved. The effect of closing switch S–7 before switch S–6 is to provide a circuit which nullifies the effect of a subsequent closing of switch S–6.

*The hydraulic system (Figs. 1a, 1b, 4)*

The hydraulic system 29 is located in the back section 24 of the yoke frame. It includes an oil sump 109, formed to permit pneumatic pressurization of a supply of oil 110 therein. The sump is pressurized by air supplied over a branch 111 of the main air line through the top wall of the sump. A solenoid valve V–10 controls flow of pressure air through line 111 to the sump.

An outlet oil line 112 from the lower end of the sump communicates through a port 113 to the return side of the oil piston chamber 58. A restricted branch 114 from oil line 112 communicates through a port 115 also to the return side of chamber 58. A servo slide valve H–2 is pneumatically operable to open and close port 113. A solenoid valve V–3 controls the flow of operating pressure air to valve H–2. A second slide servo valve H–3 is pneumatically operable to close port 115. A solenoid valve V–4 controls the flow of operating pressure air to valve H–3.

A main outlet oil line 116 communicates an oil compression tube or cylinder 117, supported at its ends in opposite end walls of the sump, through a port 118, to the head end of the oil piston chamber 58. A pneumatically operable combined servo slide valve and check valve H–1 governs the opening and closing of port 118. A solenoid valve V–1 controls flow of operating pressure air to valve H–1. Upon pressurization of the sump, oil fills the outlet line 112, and also passes through a radial port 119 to fill the compression cylinder 117 and the main outlet oil line 116.

Oil is adapted to be forced from cylinder 117 by a pneumatically powered piston pump or compressor 121. This action occurs during the dimple forming part of the stroke of ram 25. Pump 121 includes a main piston 122 which works in a cylinder 133 that is joined to the bottom wall 124 of the sump casing. A ram rod 125 carried by this piston functions to drive the oil out of the compression cylinder into the outlet line 116. A solenoid valve V–9 controls flow of operating pressure air through a check valve 126 to the piston 122.

When a hydraulic pressure above 15,000 lbs. is to be applied over oil line 116 to the oil piston 71, a booster pump 127 aids in driving the main piston 122. The booster pump has a piston 128 of relatively lesser diameter than the main piston 122. This piston works in a chamber formed by a cylinder 131 which is connected at its upper end to an end block 132 of the main pump cylinder. The booster piston carries a rod 123 which is joined axially at 134 in tandem relation to the main piston 122. A solenoid valve V–7 controls in one condition flow of operating pressure air over a branch 130 of the main air line 31 to the return side of the booster piston 128, and in a reverse condition controls flow of regulated operating pressure air over a line 120 from pressure regulator R–2 to the work end of the booster piston. A solenoid valve V–8 controls flow of operating pressure air from the main air line 31 to the work end of the booster piston 128.

The booster piston alone is pneumatically powered to drive the main piston when hydraulic pressures of 15,000 lbs. or less are to be developed over the main oil output line 116. When pressures above 15,000 lbs. are to be developed over line 116, then the booster piston and the main pump piston are both pneumatically powered. The pressure control device 34 is adjustable to predetermine the maximum hydraulic pressure to be developed over line 116 and at which the dimpling process will automatically terminate.

*The pressure control device (Figs. 1a, 7–9)*

This pressure control device 34 has a casing 135 mounted by bolts 136 to a supporting inner wall area 137 of the upper yoke arm. A reduced axial extension 138 at the rear of the casing provides a chamber 139 for a slidable sleeve 141. The forward end of this sleeve projects partway into the relatively larger chamber 142 of casing 135. A wall 143 closing over the front end of the sleeve is axially supported for sliding movement upon a stub shaft 144, the forward end of which shaft is threaded fast into and projects slightly through the opposite face of a fixed radial rib 146 of the casing. Sleeve 141 provides a chamber 147 for a pressure responsive piston 148 which is loaded by a heavy high pressure coil spring 149 to the rear of the chamber into abutment with a retaining ring 151. A light low pressure center coil spring 150 retained at its end in opposed recesses of the stub shaft 144 and of a bossed part of the piston, aids spring 149 in loading the piston to the rear of the chamber, and also serves to load sleeve 141 to the rear of its chamber 139. A switch actuator rod 152 carried by the piston extends axially through spring 150 and slidably through stub shaft 144. This rod is axially aligned for actuation or depression of a spring loaded push pin 153 which, when depressed, serves to open the contact of the micro switch S–8. Rod 152 is movable to actuate switch S–8 by means of an oil pressured rod piston 154 which is slidable in a bushing 155 of a cylinder 156 axially mounted to the rear of cylinder 138. The forward end of rod 154 abuts against the rear of the pressure piston 148, while its rear end terminates in a pressure build-up well 157 formed in the end of cylinder 156. This pressure well connects by a restricted lateral oil line 158 with the main oil line 116, so that, as the hydraulic pressure in the main oil line rises above a predetermined value, it acts over line 158 and through the rod 154 to progressively move the actuator rod 157 toward the push pin of switch S–8.

Micro switch S–8 is mounted to an upright 159 of an adjustable carriage 161, so that the position of the push pin may be carried closer to or further from the end of the actuator rod as desired. The lower end of the carriage forms a travel nut 162 which is threaded upon an elongated adjusting screw 163. This screw is journalled for rotation by reduced end portions 164, 165, the latter of which bears in the casing rib 146, and the other of which bears in a front end wall 166 of the casing 135. A travel guide for the carriage is provided by a follower nut 167 which is threaded on the screw rearwardly of the carriage nut. The follower has an upright ear portion in which is fixed an elongated pin 169 which projects freely through a complementary guide hole in the carriage upright 159. A further travel guide for the carriage nut is provided by a rail 170 over which a bifurcated end 160 of the carriage upright 159 rides as the carriage moves. It can now be seen that switch S–8 will be carried nearer to or further from the end of the actuator rod accordingly as the screw 163 is rotated in one direction or the other. The adjusting screw 163 is rotated by manually turning a micro dial fitting 172 fastened onto an external extension of the reduced end 164 of the screw.

Figure 9:
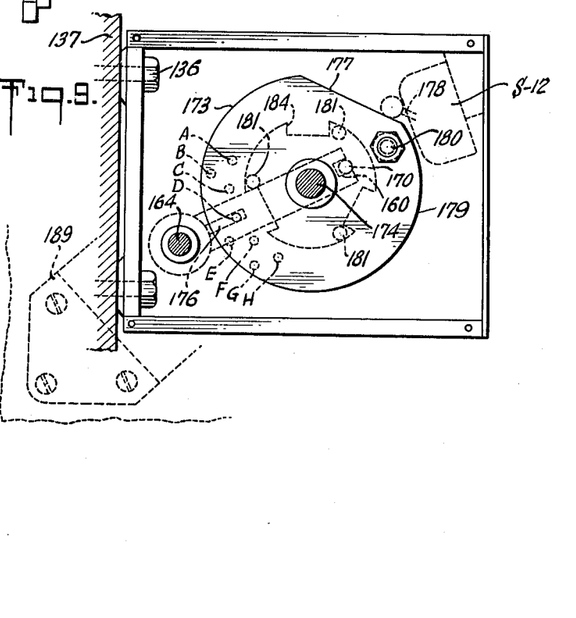
Fig. 9 is a front end view of Fig. 7 looking in the direction of the arrows from the line 9—9.

The pressure control device further includes an index disc or collar 173 which is fixed to a shaft 174. The latter is borne for rotation in bearing means at 175 supported in the front end wall of casing 135. Disc 173 carries on its rear face a set of eight pins or set screws, designated in order A to H (Fig. 9). These pins are arranged in spaced relation to each other in two arcuate rows. The pins in the lower row are in alternate spaced relation to those in the upper row. Each pin is of a different length in its projection from the face of disc 173. The arrangement is such that, as the index disc is rotated in one direction or the other, a different one of the pins is successively brought into opposed spaced register with a narrow vertical rib portion 176 of the switch carriage. As the latter is caused to travel on screw 163 away from the actuator rod 152, its travel will be stopped as the rib comes into abutment with the particular pin then registering with it. Each pin, in order, represents a maximum pressure limit of 5, 10, 15, 20, 30, 57, 75 and 100 thousand lbs. Accordingly, the setting of the pins predetermines the distance the actuator rod must move to actuate switch S–8 to terminate the dimpling process. The pressure which each particular pin represents predetermines the maximum pressure that must be developed over the main oil line in order to move the actuator rod 152 sufficiently to actuate switch S–8.

The index disc is further provided with a dwell or low peripheral cam surface 177 which is adapted to be engaged in the rotation of the disc by the roller arm 178 of a micro switch S–12. When the roller arm is engaged with the high cam surface 179, switch S–12 is open so that the solenoid valve V–9 cannot be energized; and when the roller arm is engaged with the low cam surface 177 of the disc, switch S–12 is closed and valve V–9 can be energized. Where pressures are to be developed in the oil line 116 above 15,000 lbs., then energization of valve V–9 will permit pressure air from the main line 31 to drive both the booster and main pump pistons 128, 122. The arrangement is such that, as the index disc is rotated to register a pin with the rib 176 of the carriage, the roller arm of the switch S–12 will ride on the high cam surface 179 for the low pressure pins A to C, and will ride on the low cam surface 177 of the disc for the high pressure pins D to H.

When the pressure developed over the branch oil line 158 is sufficient to overcome the load of spring 150, the piston 148 and sleeve 141 move together as a unit to carry the actuator rod 152 toward the pressure switch S–8. This unitary movement of sleeve and piston is due to the load of the heavy high pressure spring 149 within the sleeve acting on the piston. Movement of the sleeve and piston as a unit occurs where the pressure setting is 15,000 lbs. or less. Where the pressure setting is above 15,000 lbs. blocking means is provided to block movement of the sleeve, so that the piston will be required to move against the combined loads of the low and high pressure springs 150, 149. The blocking means includes three fixed pins 181 projecting from the rear face of a retainer plate 182. The pins are of equal length and located circumferentially equally apart. Plate 182 is rotatable on the stub shaft 144, and is adapted to bear against the supporting inner face of the radial support 146 as it rotates. A connecting shaft 180 fixed in disc 173 and plate 182 permits plate 182 to be rotated by rotating disc 173. An opening is provided in the support 146 to enable shaft 180 to rotate with disc 173. In the D to H settings of the index disc, the blocking pins 181 are located in opposed relation to the solid end wall area 143 of the sleeve and in close proximity thereto, so that movement of the sleeve to the left is blocked. In the A to C settings of the index disc, these blocking pins are clear of the solid area of the end wall 143 and are individually in register with a separate longitudinal channel 184 formed in the surface of the sleeve. In this latter position, the blocking pins permit the sleeve to move forwardly, and they enter the channels as it does so. A radial finger 185 of the casing depends into the mid-area of one of the channels and serves to prevent sleeve 141 from rotating as it moves forwardly.

The index disc is rotatable by manually turning a substantially triangular semaphore plate 186. The latter is fixed at its vertex upon an external projecting end of the index disc shaft 174. So as to avoid interference of the semaphore plate with the projecting shaft portion 164 of the carriage screw 163, the semaphore plate has an arcuate slot 187 through which the said end of the carriage screw freely projects. Visible pressure limit markings from 5,000 to 100,000 lbs. corresponding to the pressure limits of the index pins are on the semaphore plate. As the latter is rotated in one direction or the other, each marking is brought successively into register with a window 188 of a collar member 190 sleeving over the micro dial 172 and fixed to a strap plate 189 mounted to the outer face of the upper yoke arm 22. The reading in the window indicates the corresponding pressure limit pin then in register with the carriage rib 176.

In setting the pressure device to a desired cut-off pressure at which the dimpling operation will cease, the semaphore plate is rotated until the desired pressure marking is visible in the window. The micro dial 172 is then rotated clockwise (Fig. 8) until the rib 176 of the switch carriage abuts the set pin. If a pressure less than the maximum pressure reading in the window is desired, then, after the micro dial has been rotated as indicated, it is then rotated in the reverse direction a proportionate number of turns calculated to bring the carriage switch nearer to the actuator rod in accordance with the pressure limit desired.

*Operation of the device*

The device is prepared for operation, first by adjusting the pressure control device 34 to the cut-off pressure at which dimpling is to cease. The cut off pressure is now set at 20,000 lbs. (Figs. 8 and 9) corresponding to the pin D. Next, the pressure air supply main line valve 32 is turned to "on." In the circuit, the emergency disabling toggle switch S-2 is checked to see that it is closed; the line switches L-1, L-2 are then closed; and then the double contact switch S-4 is manually closed on contacts S-4b if a hot dimpling operation is to take place. After this is done the condition of the circuit appears as in Fig. 4, and the physical condition of the various valves appears as in the schematic drawing Figs. 1a and 1b. The ram will be in its up or idle position. In this position of the ram, switch S-3 is open as it is normally clear of the cam arm 92, while switch S-1 is engaged by the latter and its contact S-1a is open and its contact S-1b is closed. The other cam arm 93 is at this time above and clear of switches S-5, S-7 and S-10 so that of the contacts S-5a and S-5b controlled by switch S-5, contact S-5a is open and contact S-5b is closed and the single contacts of switches S-7 and S-10 are open.

Closing the hot dimple contact S-4b causes energization of the upper and lower heater relays CAP 1 and 2. These, in turn, close contacts CAP 1a, 1b and CAP 2a, 2b. Closing of contacts CAP 1a and CAP 2a energizes relays CR-6 and CR-7, which in turn close contacts CR-6a and CR-7a to cause energization of the heater elements 191, 192. Closing contact S-4b also causes energization of the upper and lower thermocouple break relays TCB-1 and TCB-2 and consequent closing of their contacts TCB-1a and TCB-2a. Solenoid valve V-3 is energized consequent to the closing of contact S-4b through normally closed contact CR-4a. If the thermocouple elements break due to excessive heat, the thermocouple relays deenergize to open their associated contacts so as to cause solenoid valve V-3 to deenergize, whereupon circuits result causing the descent of ram 25 to stop. If switch S-4 is closed on contact S-4a for cold dimpling the heater and the thermocouple relays are cut out. In the latter case valve V-3 is energized through the line closed by contact S-4a. Closing the line switches L-1, L-2 energizes solenoid valves V-1 and V-10. Valve V-4 is also energized in this conditioning process through normally closed switch S-6. At this time solenoid valves V-2, V-5, V-6, V-7, V-8 and V-9 are in their deenergized condition.

Pressure air will now flow from the main air line 31 to its various branches. It flows through the energized valve V-10 to pressurize oil sump 109, whereupon oil is forced into outlet lines 112 and 116. Pressure air flowing through the upper half V-1a of energized valve V-1 acts upon the head end of servo valve H-1 causing the latter to seal over port 118 and block oil flow to the top end of oil piston chamber 58. However, a restricted oil flow to the latter passes from line 116 through a check valve H-1a provided in the body of valve H-1. Pressure air flowing from a branch line 193 through the right half V-3a of now energized valve V-3 acts on the head end of the servo valve H-2 to unseal port 113 so as to allow oil flow from line 112 to the return side of the oil piston chamber. Energized valve V-4 vents the head end of the servo slide valve H-3 to atmosphere, so that oil from branch 114 of line 112 forces its way past this valve through a restricted passage and port 115 into the return side of the oil piston chamber 58. Pressure air over a branch line 195 passes through energized valve V-2 and a port 196 to the return side of the air piston chamber. The total pressure now being applied to the return sides of the oil and air pistons 71, 72 is greater than that being applied through the check valve H-1a at the forward end of the oil piston 71, wherefore, the ram is now held in its upper or idle position.

The operation of the machine or descent or the ram is next begun by depressing the foot switch S-9 and holding it depressed against its tendency to restore, whereupon normally closed contact S-9a opens and contact S-9b closes. This action energizes relay CR-4 to open contact CR-4a and to close contact CR-4b. Valve V-3 remains energized when CR-4a opens because of a holding circuit provided by normally closed contact S-5b. Valve V-2 becomes energized when CR-4b closes. Solenoid valve V-5 becomes energized through now closed contact S-9b and normally closed contact CR-1a. A non-repeat relay CR-3 energized upon closing of the various switches when conditioning the machine for operation, remains energized through now closed contact S-9b to hold contact CR-3a closed. Solenoid valve V-6 is also energized through now closed contacts S-9b. Energization of valve V-6 causes regulated pressure air from the regulator R-3 and line 198 to be now applied to the underside of a ram piston 201 causing the latter to enter an oil compression tube 202 of the pump 83, so as to pressurize the oil in the connected line 203, whereupon the compression block 54 is pressurized upon its seat in the die set piece 73. Valves V-2 and V-5, upon becoming energized, reverse their positions whereupon the underside of the ram air piston 72 is vented through valve V-2 over line 42 to atmosphere; and pressure air passes through valve V-5 to the top side of the air piston chamber 72. The pressures now acting on the top sides of both pistons 71, 72 being greater, the ram starts to descend slowly. As it does so, oil from the underside of the oil piston chamber 58 returns to sump through open valves H-2 and H-3. A slight descent of the ram carries cam arm 93 clear of the roller arm of switch S-1 causing the latter to shift its position so as to open contact S-1b and close contact S-1a. Valve V-1 is thereupon deenergized and reverses its position to allow pressure air flow through valve half V-1b to shift valve H-1 to open port 118 to oil line 116. Whereupon, full oil flow to the top side of the ram oil piston 71 causes the ram to rapidly descend.

As the cam moves rapidly downward for a predetermined distance, cam arm 93 reaches and actuates switch S-5 so as to close its contact S-5a and to open contact S-5b. Relay CR-1 thereupon energizes to open normally closed contact CR-1a. This deenergizes and reverses valve V-5 to vent the top side of the air piston chamber. Opening contact S-5b deenergizes and reverses the condition of valve V-3. Pressure air thereupon flows through the left half V-3b of valve V-3 to close valve H-2. The ram now being moved down by oil flow through port 118 is slowed down after valve H-2 closes, by a restricted escape of oil from the underside of the oil piston through valve H-3.

Ram 25 now approaches the work piece at this reduced rate of descent. This slow rate of descent serves to avoid ramming the work piece sharply. It also provides a period for determining if the work piece is properly positioned. If the work piece is tilted upwards, or for other reasons has a position closer to the approaching ram than it should have, the die set piece 73 will contact the work piece prematurely. This latter action will force the die set member 73 and associated sleeve 76 upwards into the ram causing the cam rod 86 to rise and actuate switch S-6 to open condition, thus causing valve V-4 to deenergize. The latter action will cause pressure air to flow through valve V-4 to force valve H-3 shut, thus completely blocking escape of oil from the underside of the oil piston chamber, whereupon further descent of the ram will stop.

Assuming the work piece to be properly positioned, then subsequent to closing switch S–5, cam arm 93 next closes switch S–7. This action provides a holding circuit shunting the S–6 switch contact to hold valve V–4 energized. As the ram die set 73 next comes into contact with the work piece, switch S–6 is actuated to open condition in the manner earlier mentioned. Its effect on valve V–4 is, however, nullified by the holding circuit established by switch S–7.

Momentarily after switch S–6 is actuated by its cam rod 86, the cam arm 93 closes switch S–10. This action starts the dimple preforming stage. Closing switch S–10 energizes relay CR–5 to close contacts CR–5a and b. Closed contact CR–5b causes energization of relay CR–2. Contact CR–2a thereupon closes to establish a holding circuit for relay CR–2; and contact CR–2b closes to reenergize valve V–3. The latter then shifts and pressure air flows through the right valve half V–3a thereof to open presently closed valve H–3. Closing of contact CR–5a energizes solenoid valve V–7 to shift so that its left half V–7a vents the return side of tandem piston 128, and the right half V–7b allows flow of regulated pressure air from regulator R–2 and line 120 through a check valve 204 to the underside of the tandem piston 128. The tandem piston then moves slowly upward forcing the main piston 122 to compress the oil in the output line 116 against the top end of the oil piston 71. A timer motor T.M. in the circuit is caused to operate upon the closing of contact CR–5a. During the action of the tandem piston, the timer motor operates and the heaters 191, 192 transmit their heat through the die elements 26, 27 to the work piece. As the ram continues to press slowly down upon the work piece, the ram pressure forces the pressure pad 49 of the punch pilot assembly 27 slightly downward and seats the button 46 causing the pin of the punch pilot 48 to rise and enter the hole of the work piece, and further causes the convex face 55 of the punch pilot to rise slightly above the table surface 52 of the pressure pad to begin or preform the dimple in the work piece 28.

As the timer motor times out, it closes a timer switch S–11 to start the power stage of the ram stroke. Closing switch S–11 energizes and shifts the conditions of solenoid valves V–8 and V–9. This causes main line pressure air from the main air line 31 to pass through valve V–8 and check valve 204 to the underside of the tandem piston 128. It also causes main line pressure air to pass through valve V–9 and check valve 126 to the underside of the main piston 122. The oil in the pressure line 116 is now compressed by the combined forces of the tandem and main pistons. Whereupon this action, ram 25 exerts a strong compressive force upon the work piece to complete the dimnpling process. As the work material is forced up into the cavity 56 of the ram set, it is acted upon at its free edges by the hydraulically loaded compression block 54 to effect a flat edge. If the pressure set by the pressure control device 34 is 15,000 lbs. or less, switch S–12 will be open and valve V–9 will be cut out. In this case in the power stage of the ram stroke the tandem piston alone as driven by the pressure air from main line 31 acts to complete the dimpling process.

During the dimpling process the hydraulic pressure over oil line 116 progressively builds up. This pressure acting over oil line 158 progressively moves the actuator rod 152 toward switch S–8 until the pressure as predetermined by the pin setting of disc 173 is reached, whereupon switch S–8 opens. This action deenergizes the non-repeat relay CR–3 to open contact CR–3a. Relay CR–4 then deenergizes causing contact CR–4a to reclose and contact CR–4b to reopen, whereupon V–2 is deenergized and shifts. Relay CR–5 is also deenergized to reopen contacts CR–5a and b. Valve 3, however, remains energized through contact CR–2b held closed by the holding circuit through closed contact CR–2a to relay CR–2.

Valves V–6, V–7, V–8 and V–9 deenergize and shift. Shifting valve V–6 causes the ram booster piston 201 to restore under air pressure passing through valve half V–6a. Shifting valves V–7, V–8 and V–9 vents the underside of the tandem and main pistons 128, 122 and permits pressure air to be applied to the return side of tandem piston 128 to restore both pistons. Shifting valve V–2 permits line air to act on the return side of the air piston 72 forcing it upward. Pressurized oil from the sump also flows over line 122 through presently open valves H–2 and H–3 to aid in returning the ram. Switches S–10, S–7 and S–5 are restored to normal open position as the ram moves upward and releases the cam arm 93 from these. As the ram moves up to returned position, cam arm 92 actuates switch S–1 to reopen contact S–1a and to reclose contact S–1b, whereupon valve V–1 is re-energized causing main line air to pass through valve half V–1a to shut valve H–1, whereupon the ram stops its upward movement as oil at the top side of the oil piston is trapped against escape.

Although the foot switch S–9 is still held depressed, the ram will not execute a repeat cycle. This is due to the deenergized condition of relay CR–3, which prevents energization of relay CR–4 and valves V–2 and V–5. To execute a repeat cycle, foot switch S–9 must first be released so as to provide a circuit through contact S–9a to energize relay CR–3 so as to close contact CR–3a. (Switch S–8 recloses as the oil pressure over line 158 is relieved.) Switch S–9 must then be redepressed to energize relay CR–4 to begin a repeat cycle of the ram.

Here it might be added that the stroke of the ram can be shortened by turning the right crank 132 clockwise to lower switches S–1 and S–3. As switch S–3 comes into contact with the cam arm 92, it closes its contact to energize valve V–2. This vents the underside of the air piston causing the ram to drop until cam 92 is again clear of switch S–3. This dropped position will be the new idle or upper position of the ram.

In cases where a thicker work piece than usual is to be used, an adjustment of the location of switch S–7 relative to the cam arm 93 must be made so as to insure that switch S–7 will operate before switch S–6. In this case the left crank handle 205 is rotated as required to raise or lower switch S–7 as needed.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A metal bending machine for exerting a strong compressive force upon a piece of supported sheet work material, comprising a housing having a table surface adapted to support the work, a ram supported in opposed relation to the table surface by the housing and adapted to descend into compressive engagement with the work, means for applying pressure fluid to the ram to effect an initial slight, slow descent thereof, means actuable by the ram in this slight descent for applying pressure fluid to the ram to effect a rapid further descent of the ram, subsequent means actuable by the ram during this rapid descent for applying pressure fluid to the ram to effect a subsequent slow descent of the ram, die set means slidably carried in an end of the ram adapted to engage the work during this latter slow descent and upon engaging the work adapted to rise up into the ram for a predetermined distance, means actuable by the ram during the latter slow descent for applying pressure fluid with increased force to the ram for a predetermined period of time following the rise of the die set means into the ram, timing means actuable by the ram during the slow descent predetermining the latter period of time, means actuable by the timing means for applying upon expiration of the said period of time a progressively increasing force of pressure fluid to the ram, and control means responsive to the latter force upon its reaching a predetermined maximum to cease further compressive action of the ram.

2. A metal bending machine as in claim 1, wherein the application of pressure fluid to the ram at the various instances is through a system of solenoid controlled valves, a control circuit is provided for effecting operation of the solenoids, a series of sequentially operable micro-switches is in the circuit controlling the operation of the solenoids and are supported in the housing in close spaced relation to the path of descent of the ram, and the ram carries cam means for effecting sequential operation of the micro-switches as it descends.

3. A metal bending machine as in claim 2, wherein a disabling micro-switch is provided in the circuit for effecting a stop action of the ram in the event the work material is disposed above its normal position on the table surface, the disabling switch being mounted for movement with the ram, a cam rod is slidable in the surface of the ram and rests at its bottom upon the die set means, the cam rod being adapted to rise up with the slidable die set means so as to actuate the disabling micro-switch, and wherein a particular one of the micro-switches is operable by the cam means prior to operation of the disabling switch when the work is disposed in its normal position, the particular micro-switch being adapted in the circuit to nullify subsequent effects of the disabling switch.

4. A metal bending machine as in claim 2, wherein the control means includes a control micro-switch in the circuit effective when actuated to cause a return movement of the ram, a spring loaded rod in spaced relation to the control micro-switch movable to actuate the latter, and piston means actuable by the pressure fluid to the ram for progressively moving the rod to actuate the control micro-switch as the force of the pressure fluid progressively overcomes the resistance of the spring load on the rod and rises to the predetermined maximum.

5. In a metal bending machine including a piston powered ram, a female die member depending axially from the bottom end of the ram including a conical cavity in its end cooperable with a complementary opposed die having a convexed surface and a pilot pin for forming a dimple in sheet material having a preformed hole disposed over the pilot pin, wherein the conical cavity communicates axially with a recess in the female member and the latter recess communicates axially with an enlarged chamber in the body of the ram; means for setting the edge of the dimple about the hole as the dimple is being formed, comprising a compression block seated in the recess and having a setting pin extending into the conical cavity, a pressure powered piston workable in the enlarged chamber, and a rod between the piston and the compression block for transmitting the pressure of the piston to the latter, wherein the rod is adjustable in length so as to allow a predetermined amount of play between the piston and the compression block whereby the compression block will be adapted to yield a predetermined amount in response to movement of the sheet material in the conical cavity as the dimple is being formed.

6. A metal bending machine for exerting a strong compressive force upon a piece of supported sheet work material, comprising a housing having a table surface adapted to support the work, a ram supported in opposed relation to the table surface by the housing and adapted to descend into compressive engagement with the work, means for applying pressure fluid to the ram to effect a rapid descent thereof, means actuable by the ram during this rapid descent for applying pressure fluid to the ram to effect a subsequent slow descent thereof, die set means slidably carried in an end of the ram adapted to engage the work as the ram descends and upon engaging the work adapted to rise up into the ram for a predetermined distance, means actuable by the ram in its descent for applying pressure fluid with increased force to the ram for a predetermined period of time following the rise of the die set means into the ram, timing means actuable by the ram in its descent predetermining the latter period of time, means actuable by the timing means for applying upon expiration of the said period of time a progressively increasing force of pressure fluid to the ram, and control means responsive to the latter force upon its reaching a predetermined maximum to cease further compressive action of the ram.

References Cited in the file of this patent

UNITED STATES PATENTS

| 1,911,138 | Clute | May 23, 1933 |
|---|---|---|
| 2,324,149 | Gray | July 13, 1943 |
| 2,375,707 | Speller | May 8, 1945 |
| 2,403,912 | Doll | July 16, 1946 |
| 2,442,949 | Fischer | June 8, 1948 |
| 2,455,702 | Rechton | Dec. 7, 1948 |
| 2,484,879 | Ernst | Oct. 18, 1949 |
| 2,491,717 | Creighton | Dec. 20, 1949 |
| 2,592,672 | Fischer | Apr. 15, 1952 |
| 2,603,067 | Nissim | July 15, 1952 |
| 2,603,176 | Sebring | July 15, 1952 |
| 2,612,756 | Peterson et al. | Oct. 7, 1952 |
| 2,612,951 | Palmleaf | Oct. 7, 1952 |
| 2,620,876 | Harness | Dec. 9, 1952 |
| 2,631,480 | Romine | Mar. 17, 1953 |
| 2,690,205 | Stary | Sept. 28, 1954 |
| 2,738,575 | Swain | Mar. 20, 1956 |
| 2,743,933 | Baines | May 1, 1956 |
| 2,759,061 | Edelman | Aug. 14, 1956 |
| 2,800,548 | Stary | July 23, 1957 |